July 21, 1959
S. KOREN
2,896,109
TELEVISION TEST APPARATUS
Filed June 7, 1954
3 Sheets-Sheet 2
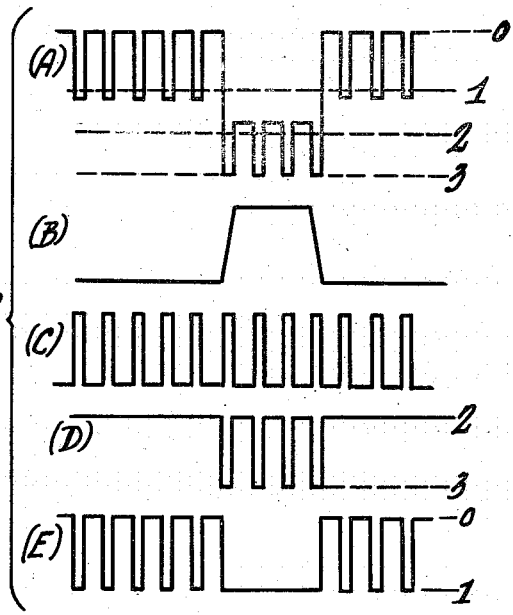
Fig.2.
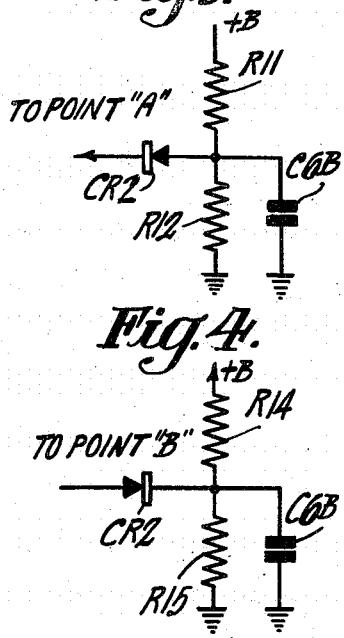
Fig.3.
Fig.4.
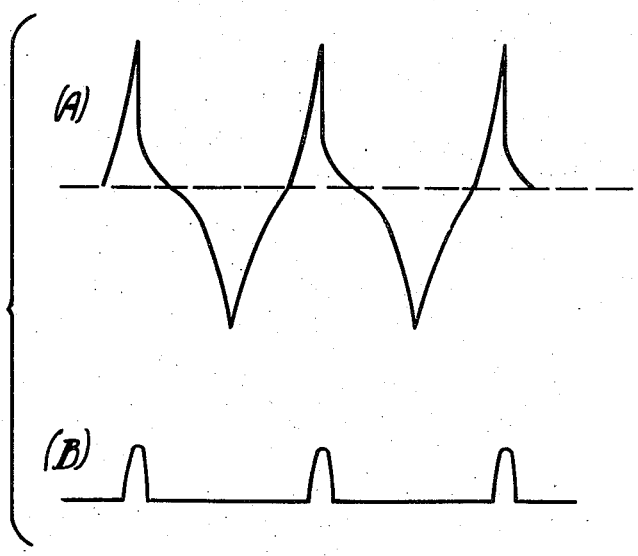
Fig.5.
INVENTOR.
Saul Koren
BY
ATTORNEY July 21, 1959     S. KOREN     2,896,109
TELEVISION TEST APPARATUS Filed June 7, 1954     3 Sheets-Sheet 3

INVENTOR.
SAUL KOREN
BY
ATTORNEY

2,896,109
TELEVISION TEST APPARATUS

Saul Koren, Woodbury, N.J., assignor to Radio Corporation of America, a corporation of Delaware Application June 7, 1954, Serial No. 434,941

10 Claims. (Cl. 315—8.5)

This invention relates to pulse producing apparatus and in particular to apparatus using pulse producing circuits for use in color television test applications.

The advent of color television broadcast in the U.S. has brought with it the need for apparatus to check the convergence of display devices used in color television receivers. Certain types of these display devices require an adjustment of the convergence of the electron guns used to produce ultimately the multi-color image. For example, the so-called "shadow-mask" tri-color kinescope, described in the October 1951 issue of the Proceedings of the I.R.E., beginning at page 1186, contains three essentially parallel electron guns. These three guns generate electron beams which are bent toward the central axis of the kinescope. Near the glass end plate of this kinescope is a planar glass plate on which are deposited approximately 585,000 phosphor dots. Thes dots are deposited in the form of "triads," that is to say, the dots as laid down are grouped so that within an elemental area, which is bounded by an imaginary equilateral triangle, one red phosphor dot, one green phosphor dot, and one blue phosphor dot are located. There are 195,000 such triads which is sufficient to give all the picture detail that can be conveyed by the overall color television system. A short distance behind the phosphor plate and intermediate the phosphor plate and the electron gun a "shadow-mask" is located. It contains 195,000 apertures which insures that each of the three beams from the electron guns, corresponding to the three primary colors, strikes the proper color phosphor within each of the triads. It is to be noted that the number of apertures corresponds to the number of triads. For ideal operation of this kinescope, the electron beams from each of the three electron guns should converge in the plane of one of the apertures of the shadow-mask at any instant of time. After the beams pass through the aperture their respective angle determines which of the phosphor dots within one triad will be struck by each beam. Since the three beams must sweep from side-to-side and from top-to-bottom to form the picture, it is evident that the three beams will not always converge in the plane of the shadow-mask since the path of the beams at the top and bottom of the kinescope is longer. Therefore, unless the beams are corrected in some fashion, the beams will diverge and strike the wrong phosphor.

This may be remedied by using various types of convergence correction systems which apply parabolic or other types of voltage waveforms derived from the various deflection circuits, or elsewhere, to the convergence electrode within the kinescope in step with the scanning position of the three beams. An example of such a dynamic convergence system is shown in a circuit and explanation appearing in the Proceedings of the I.R.E. for October 1951, at page 1260. Mechanical adjustment may also be made to correct the static convergence which is necessary because of the tolerances in the manufacture of electron guns and the effect of stray fields within the kinescope.

If all of the beams are equal in intensity and are properly converged, the viewing surface of the kinescope should appear white. It is convenient to check convergence by generating, instead of an overall white area, a number of smaller discrete areas in the form of squares, rectangles, or circles. If square or rectangular areas are produced in an array consisting of numerous rows, it is possible to check the deflection linearities by inspection of the variations in size of a square or rectangular dot as they progress from top to bottom or from side to side of the raster.

The present invention is designed to provide a pattern of optimum size rectangular dots for making all convergence adjustment in all television receivers using display means such as the RCA tri-color kinescope. It also provides a choice of horizontal bars, vertical bars, or a grid pattern of both for making linearity adjustments and convergence checks in color or monochrome receivers. The present invention provides an added convenience by making the number of bars adjustable.

The size of the rectangular dots on the face of a 15-inch tri-color kinescope viewed under normal room lighting conditions is shown so that they are easily visible. If smaller dots were used, it would probably be necessary to increase the brightness level which causes the electron beams to "bloom" or lose their small finite cross-section. This is definitely undesirable for accurate convergence adjustment techniques.

According to the present invention, waveforms are derived, which, when applied to a kinescope, form dots, horizontal and/or vertical bars, or a grid pattern on the kinescope screen. The wave for producing a horizontal bar display consists of a train of pulses having a repetition rate which is a multiple of field frequency. The number of bars displayed is dependent on the number of the multiple. Vertical bars are formed in a similar manner except that the pulse recurrence frequency is a multiple of line scanning frequency. The horizontal and vertical bars may be formed simultaneously to produce a grid pattern by applying both the low and the high frequency pulse trains to the kinescope simultaneously.

A dot pattern is formed applying to the kinescope only a selected amplitude portion of the composite wave resulting from mixing the two pulse trains together.

In other words, the two pulse trains are added together, or mutually superimposed to form a composite signal, and by means of selective amplitude clipping circuitry, the desired portion of the composite signal is extracted and applied to the kinescope, thus forming the desired dot pattern. In practice, however, it has been found desirable to form the grid pattern from only a selected portion of the composite wave. Therefore, selection of either a dot or grid pattern is made by selectively changing the selective amplitude clipping circuitry to pass the desired portion of the composite wave.

A primary object of the invention is to provide apparatus for generating a wave from which various frequency components may be extracted on an amplitude selection basis.

A further object of the invention is to provide a convenient method of checking the convergence of display devices used in color television apparatus.

Still another aim is to provide apparatus for generating a signal which produces vertical and horizontal bars, or a grid pattern on the screen of a cathode ray display means for use in testing the linearities in the deflection circuits of television apparatus.

Other objects of the invention, as well as a more complete understanding of its operation, may be found by inspection of the following description and the drawings in which:

Figure 2 is a group of curves showing the waveforms of the apparatus of Figure 1 at various points.

Figure 3 is a circuit detail of Figure 1 which shows the components required to produce a pattern of rectangular dots; and Figure 4 shows a circuit detail of Figure 1 for producing a grid pattern.

Figure 5 is a group of curves showing the operation of apparatus when internally generated vertical sync pulses are provided.

Figure 1:
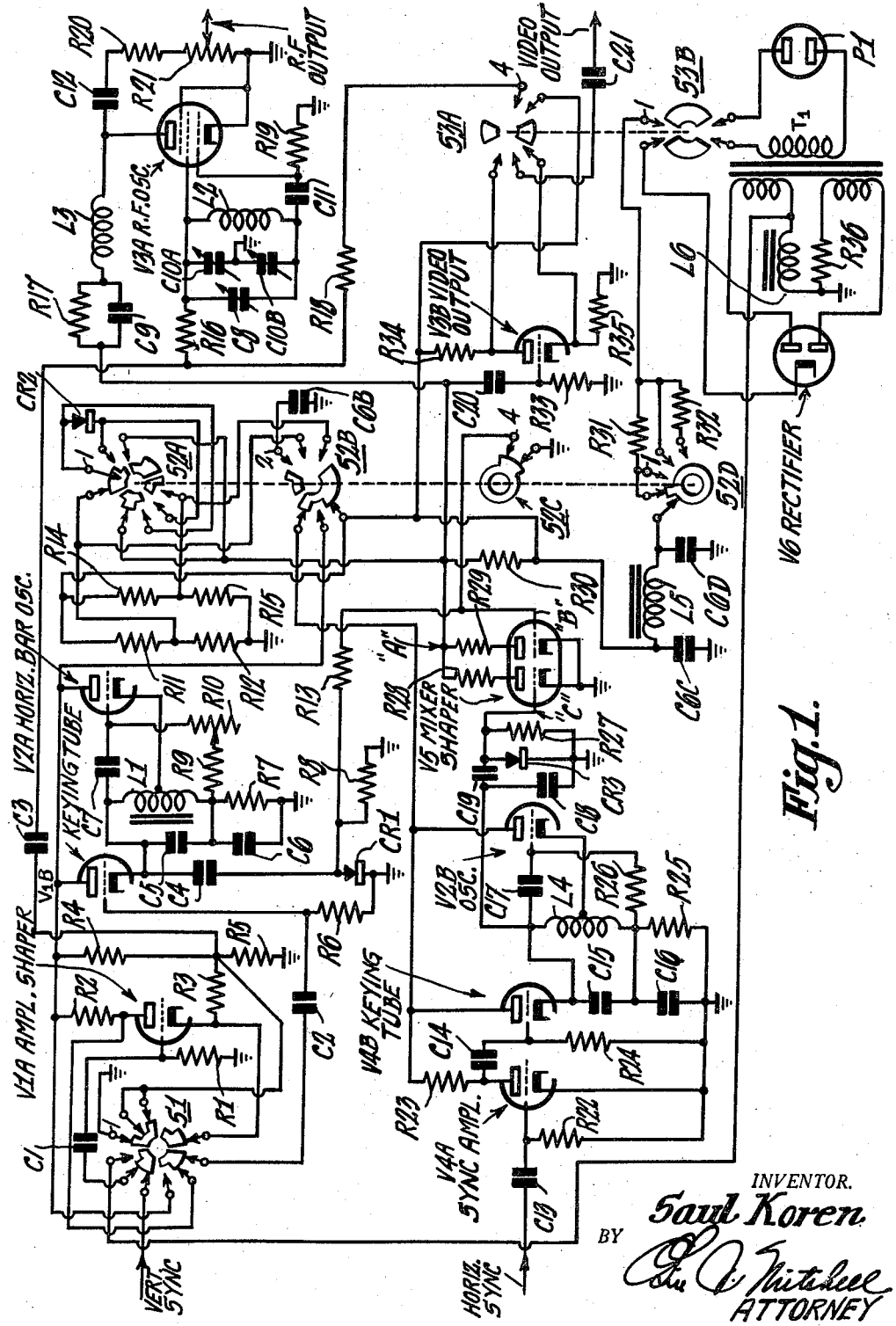
Figure 1 is an overall circuit diagram of the apparatus for producing dots or bars.
Figure 6:
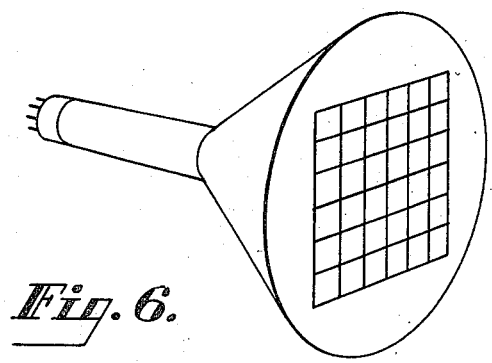
Figures 6 and 7 illustrate cathode ray tube display devices presenting grid and dot patterns, respectively.
Figure 7:
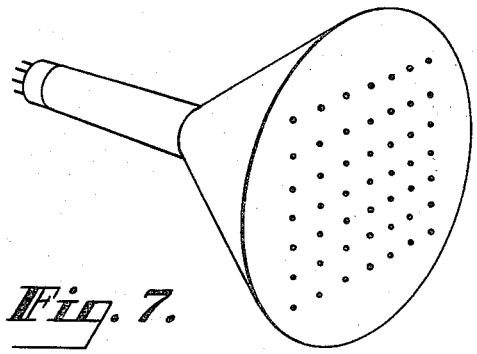

Referring to Figure 1 it may be seen that there are two input circuits to the overall apparatus. One input circuit is labeled vertical sync and the other is labeled horizontal sync. By appropriate coupling vertical sync pulses and horizontal sync pulses are derived from appropriate points in the vertical and horizontal deflection circuits of the apparatus under test. Vertical sync is usually obtained by capacity coupling to the vertical output tube of TV receivers. If this tube has a shield it may be lifted slightly to unground it and the vertical sync lead is clipped to the shield. Capacity coupling can also be obtained by connecting the vertical sync lead to a coil of about 6 turns wrapped around the vertical output tube. Provision is also made for obtaining vertical sync 60 cycle pulses from internal circuitry in this circuit, which will be described later in more detail. The vertical and horizontal input pulses key or trigger two oscillators which produce, in combination, the desired waveform.

Horizontal bar generator

The horizontal bar generator consists of a free-running Hartley oscillator V2A, keying tube V1B, and a vertical sync pulse amplifier-shaper V1A. The frequency of the oscillator V2A is adjustable from approximately 500–1000 cycles per second by means of the variable resistor R10 in the grid return circuit. The signal thus developed is squared off by the shaping circuit which consists of capacitor C4, crystal diode CR1, resistor R8, and resistor R13.

The keying tube V1B functions to maintain the frequency of the oscillator V2A at an integral multiple of vertical sync rate. Tube V1B is normally cut off by potential stored in the capacitor C2, as a result of grid-current rectification during receipt of amplified vertical sync pulses from tube V1A. However, during pulse time the grid of the tube V1B is positive, causing the tube to conduct. It will be noted that the circuit of the tube V1B is in shunt relation with the inductance L1 of the Hartley oscillator. As a result, the oscillator functions during the time between vertical sync pulses, but is quenched during sync due to the low cathode-shunt impedance of the tube V1B. The output of the horizontal bar generator is therefore comprised of a train of squared-off pulses having a repetition rate which is maintained at a multiple of field scanning frequency, and which is interrupted during vertical sync pulse time. This output is fed to the grid of mixer tube V5B.

Vertical bar generator

The vertical bar generator is quite similar to the horizontal bar generator and consists of a free-running Hartley oscillator V2B, keying tube V4B, and a horizontal sync pulse amplifier-shaper V4A. The frequency of the oscillator V2B is adjustable from approximately 185–220 kc. by means of the variable inductance L4. The signal thus developed is squared off by the shaping circuit which consists of capacitor C18, crystal diode CR3, capacitor C19 and resistor R27.

The keying tube V4B functions to maintain the frequency of the oscillator V2B at an integral multiple of horizontal sync rate. Tube V4B is normally cut off by potential stored in the capacitor C14, as a result of grid-current rectification during receipt of amplified horizontal sync pulses from tube V4A. However, during pulse time the grid of the tube V4B is positive, causing the tube to conduct. It will be noted that the circuit of the tube V4B is in shunt relation with the inductance L4 of the Hartley oscillator. As a result, the oscillator functions during the time between horizontal sync pulses, but is quenched during sync due to the low cathode-shunt impedance of the tube V4B. The output of the vertical bar generator is therefore comprised of a train of squared-off pulses having a repetition rate which is maintained at a multiple of line scanning frequency, and which is interrupted during horizontal sync pulse time. This output is fed to the grid of mixer tube V5A. After shaping it is fed to the control grid of one-half of mixer tube V5A. Since V5A and V5B are essentially in parallel, their output waves will be combined at the junction of resistors R28 and R29. The waves at points B and C of Figure 1 are shown in curves B and C of Figure 2. The wave at point A in Figure 1 is shown in curve A of Figure 2. At point B the curve shows a succession of relatively wide horizontal pulses whereas at point C the curve shows a number of narrow and closely spaced pulses. These pulses correspond to the 600 c.p.s. and the 190 kc. inputs respectively. At point A the composite wave is shown having a number of portions at various amplitude levels from 0 to 3.

By using a clipping circuit one can extract that portion of the output wave A which is to form either a grid or dot pattern. Associated with the switch S2A is a crystal diode CR2. The diode CR2 forms a clipping circuit together with resistors R11 and R12. A capacitor C6B is effectively across R12. This circuit which is shown in more detail in Figure 3 serves to clip off that portion of curve A of Figure 2 which lies between the lines 2 and 3. The resulting waveform, shown as curve D of Figure 2, forms the dot pattern on the CRT screen.

In another position of the switches S2A and S2B, the diode CR2 together with resistors R14 and R15 and capacitor C6B form another clipping circuit shown separately in Figure 4 which clips the curve A between 0 and 1 for producing the cross-hatch or grid pattern on the display means under test. The crystal CR2 and the condenser C6B provide the shorting path to ground when CR2 conducts. Condenser C6B is effectively a short circuit at the frequency under consideration.

In the position of the switches S2A and S2B as shown, which is position No. 1, B+ is supplied only to the vertical bar oscillator so that only a vertical bar signal appears at point A. The clipping circuit is inactive in position No. 1.

In the second position of switch S1A which is the rotation of the switch counterclockwise by one step, B+ is applied only to the horizontal bar oscillator so that only a horizontal bar signal appears at point A. The clipping circuit is inactive in this position also.

The output at point A may be applied either to the video section of the television receiver directly or may be used to modulate a VHF carrier for application to a receiver. If the output at point A is applied to the plate of tube V3A, it modulates a carrier wave from an oscillator including tube V3A, L2, C10A, C10B, and coupling capacitor C11. The output is applied from the plate of tube V3A via condenser C12 to an output circuit such as a jack. The VHF output is continuously tunable with adjustable amplitude over channels 2 to 6.

If a video output is desired, point A is coupled through condenser C20 to the control electrode of a video output tube V3B. The plate and cathode of tube V3B are coupled to a switch S3A which permits taking off either a positive-going or negative-going signal through a jack.

With the apparatus as described one can choose from approximately 8 to 15 horizontal bars and from 10 to 13 vertical bars.

As stated above, it is possible to employ an internally generated sync pulse having the 60 cycle vertical sync pulse repetition rate instead of coupling the apparatus to the vertical deflection circuit of the apparatus under test. This is accomplished very simply in the following manner. When switch S1 is moved from position No. 1, which is the external sync input position, to position No. 2, the circuit of V1A, instead of operating as an ordinary amplifier in a fashion similar to that of V4A, operates as a cathode follower biased beyond cutoff. The secondary of the power transformer T1 is divided into two separate windings instead of a single center-tap-grounded high voltage winding. The current in the center tap consists of sharp pulses having a 120 c.p.s. repetition rate. The pulsating current in each of the divided secondary windings has a 60 c.p.s. repetition rate. An inductance L6 is placed in series with one of the ground leads of one of these divided windings so that a very sharp peaked pulse of voltage, as shown in curve A of Figure 5, is produced. This peaked pulse is then applied to tube V1A which acts like a cathode follower which is biased beyond cutoff thus producing output pulses having the characteristics shown in Figure 5B.

Switch S2C is inserted to prevent capacity feed-through from tube V1A to tube V1B and to the grid of tube V5 when the switches S2A and S2B are in the position No. 1, the vertical bar production position and the switch S1 is in the internal vertical sync position. To correct this condition, switch S2C grounds this grid of tube V5 in the vertical bar production position, i.e., position No. 1.

Switch S2D is inserted to maintain the supplied B+ voltage essentially constant as different separating conditions arise due to rotation of switches S2A and S2B. Switch S2D inserts resistance in series with the B+ supply as required. The heaviest current drain occurs with the switches S2A and S2B in position No. 3 which is the position for the production of dots. In all other positions of switches S2A and S2B additional resistance is needed.

For Figure 1, one set of representative component values which has proved satisfactory is presented below. However, it is understood that the invention is not dependent on any of the particular values used, but is rather stated in the appended claims.

All condensers are in microfarads (mf.), all resistors are in ohms, except where otherwise noted.

| | | | | | | | |
|---|---|---|---|---|---|---|---|
| C1 | .0047 | R12 | 12K | R4 | 100K | V2B | 12AU7 |
| C2 | .01 | R13 | 56K | R5 | 22K | V3A | 6U8 |
| C3 | .47 | R14 | 4.7K | R6 | 2.2Meg | V3B | 6U8 |
| C4 | .01 | R15 | 120K | R7 | 3.9K | V4A | 12AU7 |
| C5 | .012 | R16 | 10K | R8 | 470K | V4B | 12AU7 |
| C6A | 50 | R17 | 100K | R9 | 82K | V5 | 12AU7 |
| C6B | 30 | R19 | 22K | R10 | 250K | V6 | 6X4 |
| C7 | .0015 | R20 | 100 | R11 | 120K | | |
| C8 mmf | 3–12 | R21 | 500 | | | | |
| C9 | .22 | R22 | 22K | | | | |
| C10A mmf | 70 | R23 | 18K | | | | |
| C10B mmf | 70 | R24 | 330K | | | | |
| C11 mmf | 22 | R25 | 12K | | | | |
| C12 mmf | 6 | R26 | 120K | | | | |
| C13 | .001 | R27 | 390K | | | | |
| C14 mmf | 560 | R28 | 2.7K | | | | |
| C15 mmf | 120 | R29 | 2.7K | | | | |
| C16 | .0047 | R30 | 2.7K | | | | |
| C17 mmf | 270 | R31 | 270 | | | | |
| C18 mmf | 100 | R32 | 180 | | | | |
| C19 mmf | 390 | R33 | 1Meg | | | | |
| C20 | .01 | R34 | 3.9K | | | | |
| C21 | .1 | R35 | 3.9K | | | | |
| R1 | 1.2Meg | V1A | 12AU7 | | | | |
| R2 | 150K | V1B | 12AU7 | | | | |
| R3 | 3.3K | V2A | 12AU7 | | | | |

I claim:

1. In test apparatus of the type in which pulse trains of different pulse recurrence rates are generated for selective application individually and simultaneously to the apparatus to be tested, means for producing test signals of other characteristics from said pulse trains, said means comprising a mixing circuit for producing a composite pulse train, said mixing circuit including a pair of electron discharge tubes having grid electrodes to which the generated pulse trains are individually applied, cathode electrodes connected in common and anode electrodes connected in common, and circuit components including a circuit selecting device arranged to form a plurality of selective clipping circuits each having different amplitude selection characteristics, said clipping circuits being individually connected at said common connected anode electrodes of said mixing circuit by said circuit selecting device for selecting only the desired one of a plurality of predetermined amplitude portions of said composite pulse train, thereby to produce said testing signals of other characteristics from said pulse trains, said clipping circuits comprising a unilateral conducting device and said circuit selecting device being operative, in different modes of operation, to bias said unilateral conduction device differently.

2. In test apparatus of the type in which pulse trains of different pulse recurrent rates are generated for selective application individually and simultaneously to the apparatus to be tested, means for producing test signals of other characteristics from said pulse trains, said means comprising a mixing circuit for producing a composite pulse train, said mixing circuit including a pair of electron discharge tubes having grid electrodes to which the generated pulse trains are individually applied, cathode electrodes connected in common and anode electrodes connected in common, a multi-contact selector switch, a plurality of resistors arranged to form voltage dividing networks of different values, at least one capacitor and at least one unilateral conducting device all arranged to compose a plurality of selectable clipping circuits to operate at different clipping levels, said clipping circuits being individually connected to said common connected anode electrodes of said mixing circuit by said multi-contact selector switch, said switch being operative to connect said unilateral conducting device in circuit with different ones of said voltage dividing networks for different positions of said switch for selecting only the desired one of a plurality of predetermined amplitude portions of said composite pulse train thereby to produce said test signals of other characteristics from said pulse trains.

3. Apparatus for testing display cathode ray tube circuitry of the type having means to deflect an electron beam in one direction across the face of the cathode ray tube, means to deflect the electron beam in a direction normal to said one direction across said face and means to modulate the intensity of said beam, said apparatus including means arranged for coupling to said circuitry for producing in response thereto two trains of pulses of differing recurrence rate, a mixing circuit to which said trains of pulses are applied for producing a composite pulse train, a plurality of amplitude limiting circuits having different limiting levels and being switchably arranged for selectable connection to said mixing circuit to select and extract a desired one of a plurality of amplitude portions of said composite pulse train thereby to produce a test signal having the characteristics of the selected portion of said composite pulse train, and means for applying said test signal to said display circuitry, said amplitude limiting circuits comprising a unilateral conduction device, and manually controllable means for effectively changing the polarity of connection of said conduction device to said mixing circuit.

4. Apparatus for testing display cathode ray tube circuitry of the type having means to deflect an electron beam in one direction across the face of the cathode ray tube, means to deflect the electron beam in a direction normal to said one direction across said face and means to modulate the intensity of said beam, said apparatus including means arranged for coupling to said circuitry for producing in response thereto two trains of pulses of differing recurrence rate, a mixing circuit including a pair of electron discharge tubes having cathode electrodes connected in common, anode electrodes connected in common and grid electrodes connected individually to said means for producing trains of pulses, thereby to produce a composite pulse train across said electrodes connected in common, a plurality of amplitude limiting circuits having different limiting levels and being switchably arranged for selectable connection to said common connected anodes to select and extract a desired one of a plurality of amplitude portions of said composite pulse train thereby to produce a test signal having the characteristics of the selected portion of said composite pulse train, and means for applying said test signal to said display circuitry, said amplitude limiting circuits comprising a unilateral conduction device, and manually controllable means for effectively changing the polarity of connection of said conduction device to said mixing circuit.

5. Test signal generator for use in conjunction with color television display means for selectably developing a dot pattern or a cross-hatch pattern on said display means, said signal generator comprising in combination: means for developing two sets of periodically recurring pulses having predetermined differing repetition rates; means for additively combining said two sets of periodically recurring pulses, said additive combining means having an output circuit; means coupling said pulse developing means to said additive combining means thereby to apply said two sets of pulses to said combining means whereby a composite wave composed of said two sets of pulses mutually superimposed is formed and appears at said output circuit; amplitude clipping means consisting of a diode, sources of D.C. potential, and switching means selectably connecting said diode in a predetermined polarity between said output circuit and one of said sources of D.C. potential for selecting a given amplitude portion of said composite wave, and for connecting said diode in the opposite polarity between said output circuit and another of said sources of D.C. potential for selecting another portion of said composite wave, and means for applying said individually selected composite wave portions to said television display device for developing one of said patterns when said diode is connected in one condition and for developing the other of said patterns when said diode is connected in the other condition.

6. Test apparatus for determining a plurality of characteristics of color television display apparatus of the type having means to deflect an electron beam in a plurality of directions to scan a raster, and means for modulating the intensity of said beam, said apparatus comprising in combination: means for developing a first set of periodically recurring pulses having a predetermined repetition rate; means for developing a second set of periodically recurring pulses having a repetition rate which differs from the repetition rate of said first set; means for additively combining said two sets of periodically recurring pulses, said additive combining means having an output circuit including a low terminal and a high terminal; means individually coupling said two pulse developing means to said additive combining means thereby to apply said two sets of pulses to said combining means whereby a composite wave composed of said two sets of pulses mutually superimposed is formed and appears at said output circuit; wave amplitude selective means for controllably selecting only a desired portion of said composite wave thereby to develop from said composite wave a new wave having characteristics determined by the characteristics of the portion of said composite wave from which said new wave is selected, said amplitude selective means including, unilateral conduction means, switching means having a plurality of positions, a source of direct current potential having a plurality of terminals each of which supplies a potential of different value, and filter means, said switching means being connected in such manner that when in one of said predetermined positions operably couples said unilateral conduction means in a predetermined polarity between said high terminal and one of said terminals of said direct current source and when in another of said predetermined positions operably couples said unilateral conduction means in the opposite polarity between said high terminal and another of said terminals of said direct current source, said switching means also operably connecting said filter means between said low terminal and the terminal to which said unilateral conduction device is selectably connected, whereby said desired portion of the composite wave is retained at said output circuit while the undesired portion is effectively short-circuited by said unidirectional conduction means and said filter means, said portions being determined by the polarity of said unidirectional conduction means and the value of the direct current potential at the terminal to which said unidirectional conduction device is connected.

7. Apparatus for testing display cathode ray tube circuitry of the type having means to deflect an electron beam in one direction across the face of the cathode ray tube, means to deflect the electron beam in a direction normal to said one direction across said face and means to modulate the intensity of said beam, said apparatus having an A.C. to D.C. power conversion means of the transformer, rectifier and filter type including an impedance means in series with the secondary winding of said transformer for deriving a train of pulses having a repetition rate equal to the frequency of the A.C. power source, said apparatus including one circuit arranged for coupling to the first said means to produce in response thereto a train of pulses, another circuit arranged for coupling to said impedance means for utilizing said train of pulses derived therefrom, a mixing circuit to which said trains of pulses are applied to produce a composite pulse train and circuit components including a circuit selecting device arranged to form a plurality of selectable clipping circuits each having different amplitude selection characteristic, said clipping circuits being individually connected to said mixing circuit by said circut selecting device for selecting only the desired one of a plurality of predetermined amplitude portions of said composite pulse train, to produce a test signal for application to the beam modulating means of said display circuitry.

8. A circuit arrangement for deriving voltage pulses and a continuous D.C. potential from A.C.-to-D.C. power conversion means of the type having transformer means, rectifier means, and filter means, said arrangement comprising in combination: impedance means; said transformer means having a primary winding and a secondary winding, means for coupling said primary winding to a source of A.C. power; said rectifier means having a plurality of electrodes, one end of said secondary winding being connected to one of said rectifier electrodes, said impedance means coupling the other end of said secondary winding to a point of common reference potential; said filter means being connected between another rectifier electrode and said other end of the secondary winding, whereby a continuous D.C. potential is derived across said filter means, and said pulses are derived between said point of common potential and the connection between said impedance means and said other end of the secondary winding.

9. A circuit arrangement for deriving voltage pulses and continuous D.C. potential from A.C.-to-D.C. power conversion means of the type having transformer means, rectifier means and secondary of said A.C. potential and means, comprising in combination: impedance means; said transformer means having primary and secondary windings; a closed circuit consisting of said secondary winding, said rectifier means, said filter means and said impedance means all connected in series relation; means for energizing said primary winding with an A.C. potential thereby to produce unidirectional current flow in said series circuit for at least a portion of a half cycle of said A.C. potential and to cause energy to be stored in said filter means during said portion of a half cycle; means for extracting said stored energy from said filter means thereby to obtain said continuous D.C. potential, and means for extracting the voltage pulses derived across said impedance means due to current flowing through said impedance means during said portion of a half cycle of A.C. potential.

10. Apparatus for producing periodically recurring pulses from a substantially sine wave source of voltage comprising in combination, a transformer having a primary winding and first and second secondary windings, a rectifier device having a plurality of anode electrodes and a cathode electrode, energy storage means, impedance means coupling one end of each of said secondary windings separately to a point of common reference potential, the other ends of said secondary windings being connected to separate anode electrodes of said rectifier device, said energy storage means being connected between said cathode electrode and said point of common reference potential, said periodically recurring pulses being derived at the connection of said secondary winding ends and said impedance means.

References Cited in the file of this patent

UNITED STATES PATENTS

| | | |
|---|---|---|
| 2,105,870 | Vance | Jan. 18, 1938 |
| 2,292,045 | Burnett | Aug. 4, 1942 |
| 2,421,340 | Levy | May 27, 1947 |
| 2,466,044 | Schoenfeld | Apr. 5, 1949 |
| 2,477,615 | Ishster | Aug. 2, 1949 |
| 2,524,790 | Grunwald | Oct. 10, 1950 |
| 2,539,971 | Potjer | Jan. 30, 1951 |
| 2,546,371 | Peterson | Mar. 27, 1951 |
| 2,605,410 | Friend | July 29, 1952 |
| 2,606,289 | Stanton | Aug. 5, 1952 |
| 2,677,759 | Madey | May 4, 1954 |
| 2,693,530 | MacDonald | Nov. 2, 1954 |
| 2,700,699 | Kaplan | Jan. 25, 1955 |
| 2,703,364 | Birnbaum | Mar. 1, 1955 |
| 2,739,233 | Clayton | Mar. 20, 1956 |
| 2,741,722 | Shields | Apr. 10, 1956 |

FOREIGN PATENTS

| | | |
|---|---|---|
| 129,097 | Australia | Sept. 13, 1948 |